(No Model.)

R. M. HUNTER.
ELECTRIC RAILWAY.

No. 384,911.  Patented June 19, 1888.

Attest-
Henry Drury
E. W. Breckinreed

Inventor-
R. M. Hunter

N. PETERS, Photo-Lithographer, Washington, D. C.

UNITED STATES PATENT OFFICE.

RUDOLPH M. HUNTER, OF PHILADELPHIA, PENNSYLVANIA.

ELECTRIC RAILWAY.

SPECIFICATION forming part of Letters Patent No. 384,911, dated June 19, 1888.

Application filed April 28, 1888. Serial No. 272,123. (No model.)

*To all whom it may concern:*

Be it known that I, RUDOLPH M. HUNTER, of the city and county of Philadelphia, and State of Pennsylvania, have invented an Improvement in Electric Cars, of which the following is a specification.

My invention has reference to electric cars, or those carrying a source of electric power; and it consists of certain improvements, all of which are fully set forth in the following specification and shown in the accompanying drawings, which form part thereof.

This application is a division of subject-matter set out in the other applications—to wit, the arrangement of the secondary batteries within compartments on the car, with doors opening therefrom upon the outside of the car-body, is from my applications No. 214,309, of 1886, and No. 239,930, of 1887, which latter is also a division of the former, the longitudinal seats in the car with compartments under them and battery-cells in said compartments is from application No. 261,402, of 1888, and the automatic coupling of the batteries in the car was originally set out in my application No. 220,240, of 1886.

In carrying out my invention I provide the car-body with compartments, preferably under the seats and opening upon the outside of the car through its lateral walls, the said openings being provided with doors hinged or otherwise suitably secured. Into these compartments the battery-cells are removably inserted, and preferably rest upon slides or trays which can with their burden of battery-cells be drawn out or pushed into place, as required. I also prefer to provide suitable automatic means for coupling up the batteries on the car when they or their slides are pushed into place, and in doing this I use contacts which extend from battery to battery, and also connect with the regulator for the motor or motors. By this means the batteries and their trays or slides may be removed without disturbing the connections of the electrical circuits on the car.

The battery may be employed to supply electricity to any form of translating device on the car in place of, or in addition to, the motor. Thus an electric signal, an electric light, or electric heater may be supplied with current from this source.

Figure 1:
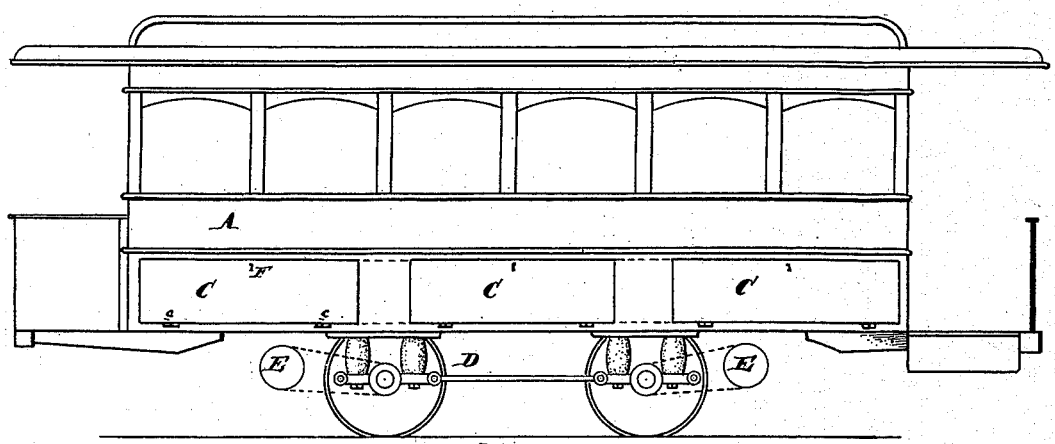
Figure 3:
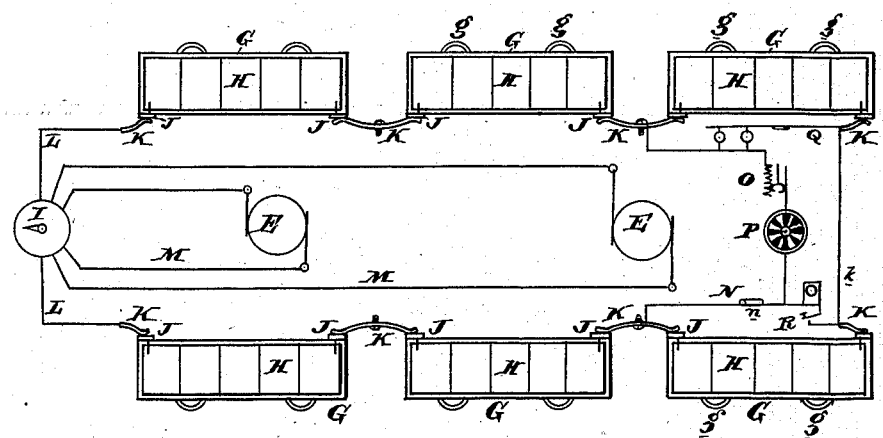
Figure 2:
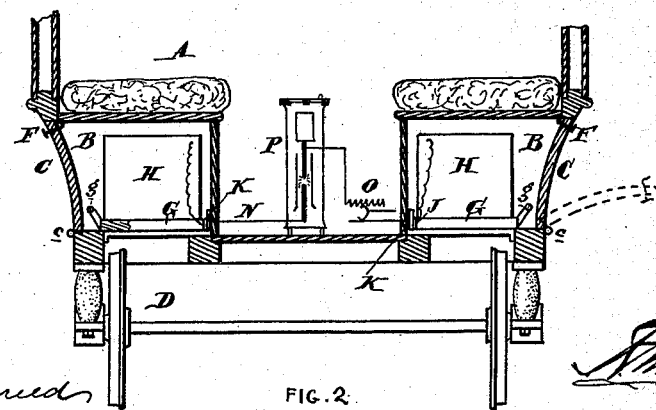

In the drawings, Figure 1 is a side elevation of an electric car embodying my improvements. Fig. 2 is a cross-section of the lower part of same, and Fig. 3 is a plan view showing the various electrical connections, batteries, motors, &c.

A is the car-body proper, which may be of any of the usual types and supported upon a suitable truck, D, provided, if desired, with the electric motors E. Under the seats of the car are compartments B, into which the batteries are placed upon the sills of the car, or suitable supports arranged therefor. These compartments have openings upon the outside of the car-body below the windows, which are closed by suitable doors or covers, C, hinged at c, or otherwise secured or supported to or by the car-body, so that the outward appearance of the car is the same as ordinary cars. These doors or covers form a part of the car-wall. By this means, whether the batteries are in or out, the appearance of the car is the same, and no openings are left for the collection of dirt by the removal of said batteries. The doors C may be locked in place by suitable locks or catches, F.

G are slides or trays upon which the battery-cells H are supported and by which they are moved, the said trays or slides having handles $g$, for obtaining a hold in withdrawing them, the said handle and slide or tray being inclosed back of the door C and normally out of sight. The battery-cells H on each slide are connected up in series, or otherwise, if desired, and their terminals are connected with the contact-pieces J J on the slide or tray G.

Secured within the compartments B are spring or other contacts K, of suitable construction, against which the contacts J press when the batteries are inserted, and these contacts K couple the various batteries H in series or other predetermined order. The two distant contacts K are preferably connected by wire $k$, and the front contacts K are connected by wires L with the regulator I, from which the current is led to the motors E by conductors M. The regulator may be used to vary the motor resistance in various ways, leaving the batteries always coupled in the same manner, and preferably in series.

Connecting with the contacts K, so as to include one or more batteries H, is a circuit, N, having a circuit-breaking key, $n$, a regulator, O, and a suitable electric heater, P, the particular construction of which is of secondary importance.

The regulator O is used to vary the current passing to the heater. It will thus be observed that the electric heater is in multiple connection with the motor or motors.

It is evident that the heater may include all of the cells of the batteries by simply having its conductor N coupled with the contacts K which supply current to the wires L, and this would make the batteries discharge more uniformly—a point to be remembered in recharging them.

The compartment B on each side of the car may be divided above each axle, and while the doors C may be made like a single long door on each side, (see dotted lines,) yet by making them separate and using separate batteries in each the bending or warping of the car-body will not injure these doors or battery-supports. It would also be best to arrange the doors to one side of the axles, as shown, as the main bending strain comes over the axles. The batteries may be used to supply current to any translating device, such as lights or alarms, in addition to the motors and heaters.

The parts Q indicate a lighting-circuit and parts R indicate a signal-circuit; but in this application I do not claim the combination of these elements with a secondary battery. By making the compartments open on the outside of the car and using comparatively loosely-fitting doors or covers the gases from the batteries may pass off into the atmosphere.

While the constructions shown are desirable, I do not limit myself to the details, as they may be varied in many ways without departing from my invention.

In this application I do not claim the secondary battery specifically supplying electricity to heaters, lighting and signaling circuits, nor batteries arranged in compartments in the plane of the wheels, as these matters are embodied in my applications No. 208,418, of 1886, No. 214,309, of 1886, No. 239,930, of 1887, No. 240,880, of 1887, No. 250,842, of 1887, No. 271,923, of 1888, and No. 261,402, of 1888.

Having now described my invention, what I claim as new, and desire to secure by Letters Patent, is—

1. In an electric railway, an electrically-propelled vehicle provided with a compartment under the side seats and windows, and a door extending along the outside of the car, forming the wall of the car-body, in combination with cells of a secondary battery arranged within said compartment independent of said wall-door and capable of removal through said doorway.

2. A car having seats arranged longitudinally upon the car, in combination with compartments under said seats and battery-cells arranged within said compartments.

3. The combination of a car-body having seats and compartment under said seats opening to the outside of the car, a removable battery arranged within said compartment, whereby the gases may pass from the battery out into the atmosphere, a loosely-fitting door or cover for said compartment independent of the battery, means to secure it in place on the car so that it forms part of the wall of the car-body, a circuit permanently on the car-body, a translating device in said circuit, and a coupling device or devices permanently located in the compartment for connecting up the battery with the circuit on the car.

4. The combination of a car-body having seats and a battery-compartment under said seats, and in which the car-wall is formed with two or more separate openings to said compartment, separate doors or covers for said openings to said compartment, and separate batteries in the compartment in line with each door, and connecting-circuits for said batteries, whereby any bending or warping of the car-body will not interfere with the doors or batteries.

5. The combination of a car-body having seats and a battery-compartment under said seats, and in which the car-wall is formed with two or more separate openings to said compartment, and to one side of the support of the car-body on the axles, separate doors or covers for said openings to said compartments, and separate batteries in the compartment in line with each door, and connecting-circuits for said batteries, whereby any bending or warping of the car-body will not interfere with the doors or batteries.

6. The combination of a car-body having seats and a battery-compartment under said seats, and in which the car-wall is formed with two or more separate openings to said compartment, separate doors or covers for said openings to said compartment, and separate removable slides or trays supporting batteries in the compartment in line with each door, and connecting-circuits for said batteries, whereby any bending or warping of the car-body will not interfere with the doors or batteries.

In testimony of which invention I hereunto set my hand.

RUDOLPH M. HUNTER.

Witnesses:
E. M. BRECKINREED,
ERNEST HOWARD HUNTER.